(12) United States Patent
Ding

(10) Patent No.: US 12,386,211 B2
(45) Date of Patent: Aug. 12, 2025

(54) SILICON OPTICAL PHASE SHIFTER WITH A SERIES OF P—N JUNCTIONS

(71) Applicant: Nokia Solutions and Networks Oy, Espoo (FI)

(72) Inventor: Jianfeng Ding, New York, NY (US)

(73) Assignee: Nokia Solutions and Networks Oy, Espoo (FI)

(*) Notice: Subject to any disclaimer, the term of this patent is extended or adjusted under 35 U.S.C. 154(b) by 219 days.

(21) Appl. No.: 17/970,020

(22) Filed: Oct. 20, 2022

(65) Prior Publication Data

US 2024/0134215 A1 Apr. 25, 2024
US 2024/0231132 A9 Jul. 11, 2024

(51) Int. Cl.
G02F 1/025 (2006.01)
G02F 1/015 (2006.01)
G02F 1/21 (2006.01)
G02F 1/225 (2006.01)

(52) U.S. Cl.
CPC ............ G02F 1/025 (2013.01); G02F 1/0152 (2021.01); G02F 1/212 (2021.01); G02F 1/2257 (2013.01); G02F 2203/50 (2013.01)

(58) Field of Classification Search
CPC ....................................................... G02F 1/025
See application file for complete search history.

(56) References Cited

U.S. PATENT DOCUMENTS

| 4,997,246 A * | 3/1991 | May .................... G02F 1/025 385/2 |
| 9,104,047 B2 | 8/2015 | Manouvrier |
| 10,191,350 B2 | 1/2019 | Yu et al. |
| 10,908,439 B2 | 2/2021 | Baehr-Jones et al. |
| 2003/0059190 A1* | 3/2003 | Gunn, III ............... G02B 6/132 385/130 |
| 2006/0008223 A1* | 1/2006 | Gunn, III ................ G02F 1/025 385/129 |
| 2006/0133754 A1* | 6/2006 | Patel .................... G02B 6/1228 385/129 |

(Continued)

FOREIGN PATENT DOCUMENTS

| CN | 112666728 A * | 4/2021 |
| CN | 112946930 A | 6/2021 |
| EP | 3264166 B1 * | 4/2020 |

OTHER PUBLICATIONS

Hao Xu et al; High speed silicon mach-Zehnder modulator based on interleaved PN junctions 2012, (Optics Express, vol. 20 No. 14, Jul. 2, 2012, 15093-15099).

(Continued)

*Primary Examiner* — Michael Stahl
(74) *Attorney, Agent, or Firm* — Duft & Bornsen, PC

(57) ABSTRACT

An apparatus includes a silicon (Si) optical phase shifter. In an embodiment, the optical phase shifter comprises a planar optical waveguide having a silicon optical core, and a pair of biasing electrodes located along opposite sides of a segment of the silicon optical core. The segment of the silicon optical core comprises a series of p-n junctions. The series extends in a direction transverse to an optical propagation direction in a segment of the planar optical waveguide including the segment of the silicon optical core. At least two of the p-n junctions are configured to be reverse biased by applying a voltage across the biasing electrodes.

17 Claims, 13 Drawing Sheets

(56) References Cited

U.S. PATENT DOCUMENTS

| | | | |
|---|---|---|---|
| 2009/0190875 A1* | 7/2009 | Bratkovski | G02F 1/025 |
| | | | 257/E33.001 |
| 2011/0058764 A1 | 3/2011 | Kim et al. | |
| 2011/0176762 A1* | 7/2011 | Fujikata | G02F 1/025 |
| | | | 427/64 |
| 2012/0063714 A1 | 3/2012 | Park et al. | |
| 2014/0127842 A1* | 5/2014 | Song | H01P 11/001 |
| | | | 438/31 |
| 2014/0233878 A1* | 8/2014 | Goi | G02B 6/122 |
| | | | 385/14 |
| 2018/0011347 A1* | 1/2018 | Ishikura | G02F 1/025 |
| 2020/0133091 A1* | 4/2020 | Oh | G02F 1/2257 |
| 2021/0072614 A1* | 3/2021 | Yoo | G02F 1/2257 |
| 2021/0373363 A1* | 12/2021 | Zhou | G02F 1/0151 |
| 2023/0324723 A1* | 10/2023 | Suzuki | G02F 1/0154 |
| | | | 359/279 |

OTHER PUBLICATIONS

Xi Xiao et al; 25 Gbit/s silicon microring modulator based on misalignment-tolerant interleaved PN junctions; 2012, (Optics Express vol. 20 No. 3, Jan. 30, 2012, 2507-2515).
European Search Report; Application 23203732.5; Mar. 21, 2024.

* cited by examiner

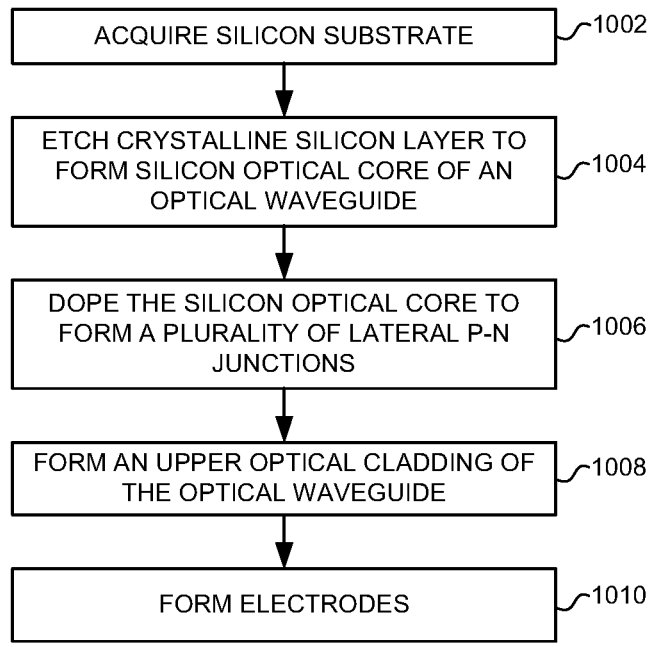
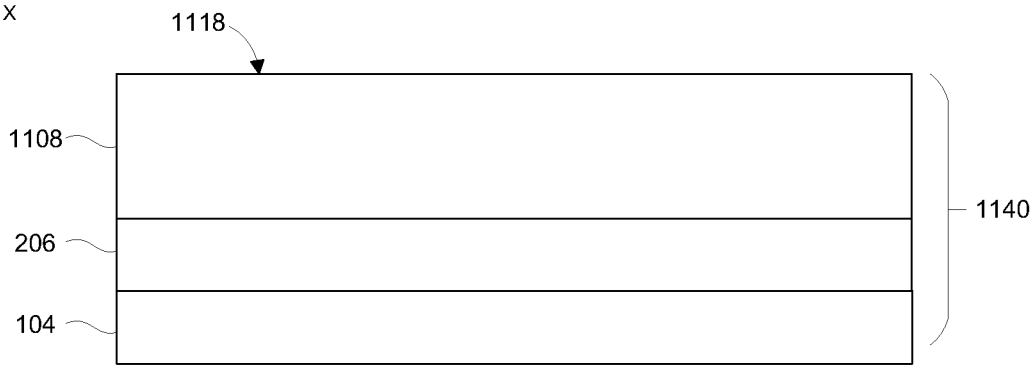

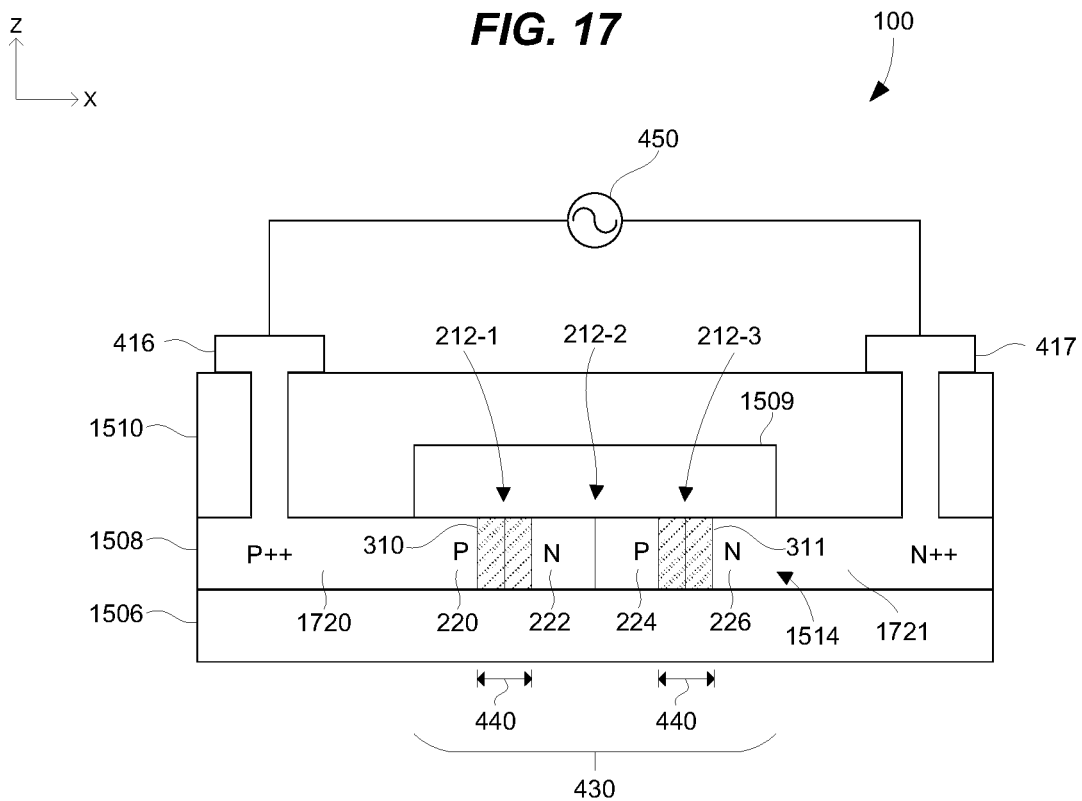
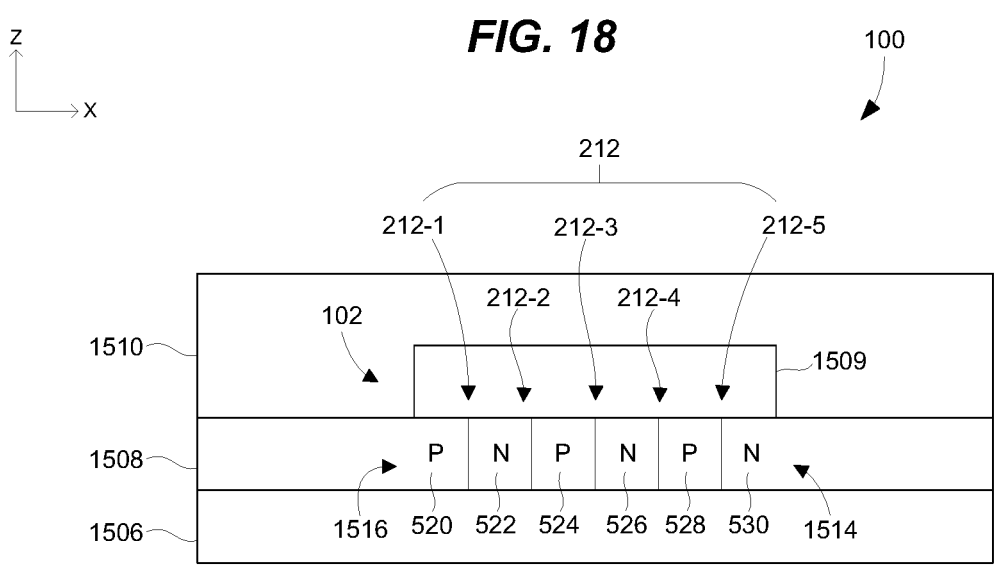

SILICON OPTICAL PHASE SHIFTER WITH A SERIES OF P—N JUNCTIONS

TECHNICAL FIELD

Various example embodiments relate to the field of optical communications.

BACKGROUND

In silicon (Si) photonics, a Si optical phase shifter is widely used in different kinds of optical devices, such as a Si optical modulator. Unfortunately, some Si optical phase shifters suffer from capacitance issues, especially at higher frequencies.

SUMMARY

Various embodiments provide a Si optical phase shifter with a plurality of lateral p-n junctions. In general, when a p-n junction is biased at a reverse voltage, the p-n junction operates in carrier depletion mode where carriers drift out of and into a Si optical waveguide. The plasma/carrier dispersion effect (e.g., carrier depletion) generates an optical phase shift in light traveling along the Si optical waveguide. A Si optical phase shifter having multiple lateral p-n junctions in series reduces the overall capacitance of the Si optical waveguide. One technical benefit is a Si optical phase shifter as described herein may be used in higher frequency applications for high-speed or super high-speed operation, while maintaining similar modulation efficiency and/or optical loss as prior Si optical phase shifters.

In an embodiment, an apparatus includes an optical phase shifter comprising a planar optical waveguide having a silicon optical core, and a pair of biasing electrodes located along opposite sides of a segment of the silicon optical core. The segment of the silicon optical core comprises a series of p-n junctions that extends in a direction transverse to an optical propagation direction in a segment of the planar optical waveguide including the segment of the silicon optical core. At least two of the p-n junctions are configured to be reverse biased by applying a voltage across the biasing electrodes.

In an embodiment, at least another of the p-n junctions is located between the two of the p-n junctions and is configured to be forward biased by applying the voltage across the biasing electrodes.

In an embodiment, the apparatus further comprises at least one radio-frequency traveling-wave electrode to operate the optical phase shifter.

In an embodiment, the apparatus further comprises a Mach-Zehnder optical modulator having a parallel pair of optical waveguide arms, and the optical phase shifter is along one of the optical waveguide arms.

In an embodiment, the apparatus further comprises at least one radio-frequency traveling-wave electrode configured to operate the optical phase shifter of the Mach-Zehnder optical modulator.

In an embodiment, the apparatus further comprises an optical modulator comprising an optical ring resonator, and the optical phase shifter is along an optical waveguide segment of the optical ring resonator.

In an embodiment, at least two of the p-n junctions are located on opposites sides of a lateral center of the silicon optical core in the segment thereof.

In an embodiment, the planar optical waveguide has a geometry of a rib waveguide.

In an embodiment, the planar optical waveguide includes a rib, with the rib being on a surface of the silicon optical core and being oriented along the optical propagation direction.

In an embodiment, the rib comprises silicon nitride.

In an embodiment, a segment of the rib faces the segment of the silicon optical core comprising the series of p-n junctions.

In an embodiment, an apparatus includes a Mach-Zehnder optical modulator having a parallel pair of optical waveguide arms, where an optical phase shifter is along one of the optical waveguide arms. The optical phase shifter comprises a planar optical waveguide having a silicon optical core, and a pair of biasing electrodes located along opposite sides of a segment of the silicon optical core. The segment of the silicon optical core comprises a series of p-n junctions that extend in a direction transverse to an optical propagation direction in a segment of the planar optical waveguide including the segment of the silicon optical core. At least two of the p-n junctions are configured to be reverse biased by applying a voltage across the biasing electrodes.

In an embodiment, a method of fabricating a planar optical waveguide is disclosed. The method comprises acquiring a silicon substrate comprising a crystalline silicon layer formed on a lower optical cladding layer, etching the crystalline silicon layer to form a silicon optical core of the planar optical waveguide, and doping the silicon optical core to form a series of p-n junctions that extends in a direction transverse to an optical propagation direction in a segment of the planar optical waveguide. The method further comprises forming an upper optical cladding of the planar optical waveguide on the silicon optical core, and forming a pair of biasing electrodes along opposite sides of a segment of the silicon optical core.

One or more of the above embodiments may be combined as desired.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 10 is a flow chart illustrating a method of fabricating a Si optical phase shifter in an illustrative embodiment.

FIGS. 11-14 illustrate results of fabrication steps of the method in FIG. 10 in illustrative embodiments.

FIGS. 15-17 are cross-sectional views of a Si optical phase shifter in an illustrative embodiment.

FIGS. 18-20 are cross-sectional views of a Si optical phase shifter in an illustrative embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the claims. The inventive concepts are not limited to the specific embodiments or examples described below, but are defined by the claims and their equivalents.

Herein, a silicon optical waveguide is a planar optical waveguide having a silicon optical core. Part(s) of the silicon optical core may be impurity doped, e.g., to form p-n and/or p-i-n junction(s) therein.

Figure 1:
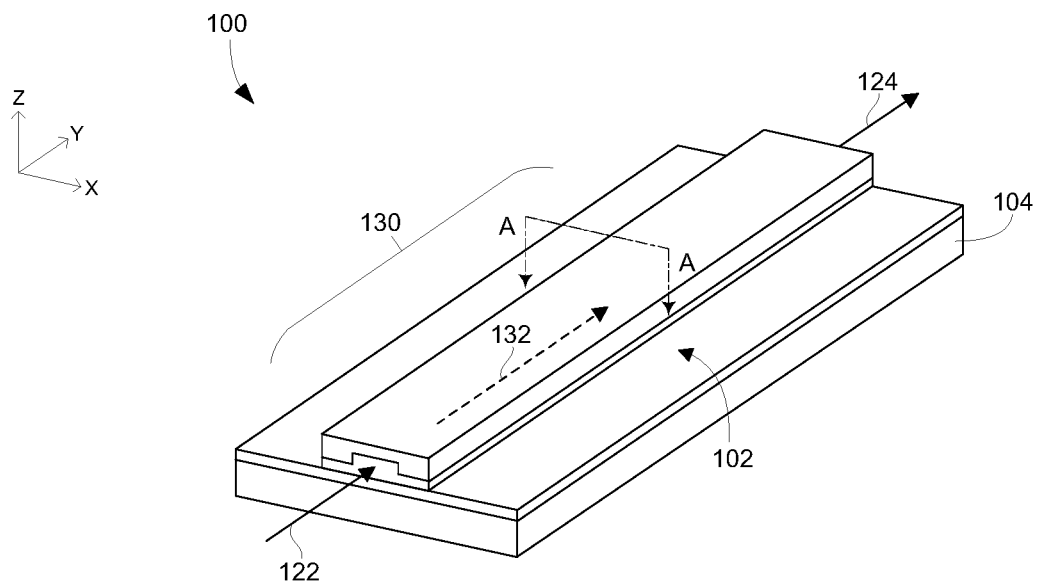
FIG. 1 is a perspective view of a silicon (Si) optical phase shifter in an illustrative embodiment.

FIG. 1 is a perspective view of a silicon (Si) optical phase shifter 100 in an illustrative embodiment. A Si optical phase shifter 100 is an optical device configured to control the phase of light by a change in effective refractive index (n). Si optical phase shifter 100 includes a Si optical waveguide 102 formed on a Si substrate 104. For example, Si optical phase shifter 100 may be formed on a Silicon-On-Insulator (SOI) wafer having an insulating layer, such as silicon oxide, between a crystalline Si layer and the Si substrate 104. Various layers of Si optical waveguide 102, e.g., the silicon optical core, may be formed from the Si layers of the SOI wafer, and/or silicon subsequently deposited or formed. As will be described in more detail below, Si optical phase shifter 100 includes a plurality of lateral p-n junctions embedded in a segment 130 of Si optical waveguide 102. Si optical phase shifter 100 employs carrier depletion as a mechanism to electrically modulate free carrier densities of the lateral p-n junctions in Si optical waveguide 102. Carrier density variations are responsible for refractive index variations in Si optical waveguide 102, and the phase of an optical signal propagating through Si optical waveguide 102 (i.e., along a light or optical propagation direction 132) is modulated based on carrier density variations. For example, an optical signal 122 launched into Si optical waveguide 102 is phase modulated to produce a phase-modulated output signal 124.

Figure 2:
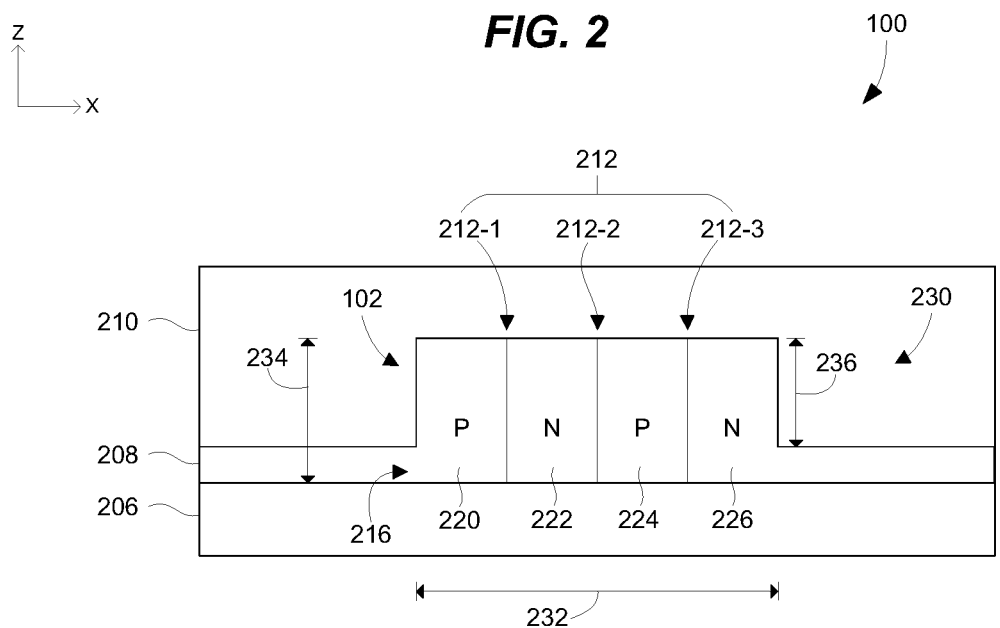
FIGS. 2-4 are cross-sectional views of a Si optical phase shifter in an illustrative embodiment.
Figure 3:
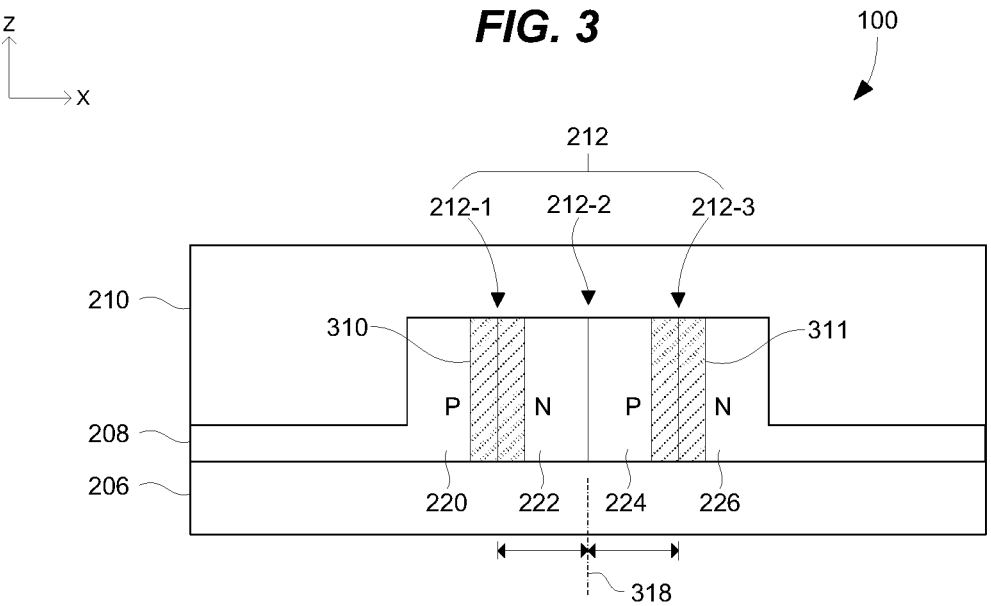
Figure 4:
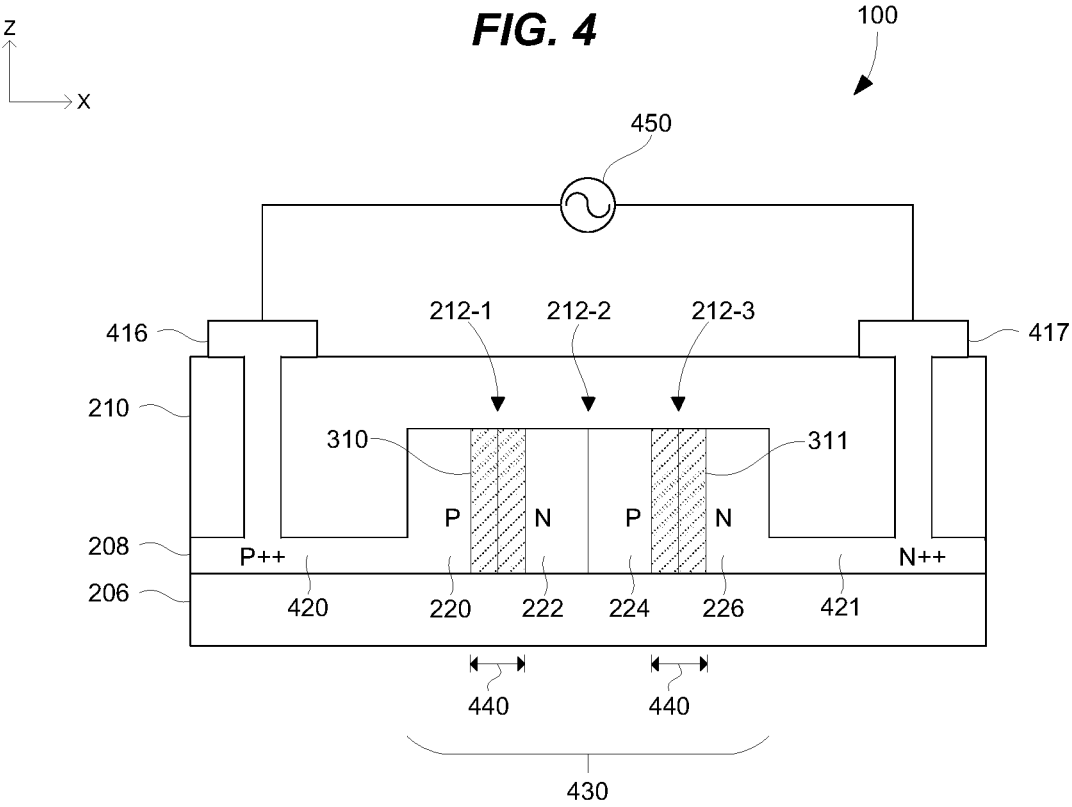

FIGS. 2-4 are cross-sectional views of Si optical phase shifter 100 in an illustrative embodiment. The views in FIGS. 2-4 are across a transverse cut plane A-A (e.g., along the x-axis) as shown in FIG. 1, which is generally perpendicular to the light propagation direction 132 through Si optical waveguide 102 (e.g., along the y-axis). The Si optical waveguide 102 of Si optical phase shifter 100 includes a lower optical cladding layer 206, a Si optical core 208, and an upper optical cladding 210 in the vertical direction along the z-axis. The lower optical cladding layer 206 may comprise a layer of silicon dioxide (e.g., $SiO_2$), such a silicon buried oxide (BOX), or another type of dielectric that acts as a lower optical cladding for Si optical core 208. Si optical core 208 may be a polycrystalline or amorphous Si overlayer in contact with the lower optical cladding layer 206, and has a higher refractive index than the lower optical cladding layer 206. Upper optical cladding 210 may comprise a layer of silicon dioxide or another optical cladding in contact with Si optical core 208 that has a lower refractive index than Si optical core 208. Additional elements of Si optical phase shifter 100 may be incorporated as desired. Also, FIGS. 2-4 are not drawn to scale.

In FIG. 2, Si optical phase shifter 100 includes a series 216 of lateral p-n junctions 212 in Si optical core 208, where the series 216 extends perpendicular to the light propagation direction 132 in Si optical waveguide 102, e.g., the p-n junctions 212 may approximately form a stack perpendicular to the light propagation direction 132. A p-n junction 212 is an interface between a p-type silicon material and an n-type silicon material.

In an embodiment, three p-n junctions 212 (i.e., first, second, and third lateral p-n junctions 212-1, 212-2, and 212-3) are located in a series 216 across a width of Si optical core 208. Electrically, the p-n junctions 212-1, 212-2, and 212-3 are series-connected across a direct voltage bias network. The lateral p-n junctions 212 are created by doping the crystalline Si material of the Si optical core 208. The doping creates a first p-type region 220 and a first n-type region 222, and creates a second p-type region 224 and a second n-type region 226. The doping creates two lateral p-n junctions 212-1 and 212-3 of the same orientation, and another p-n junction 212-2 oppositely oriented. Lateral p-n junctions 212-1 and 212-3 are reverse-biased during operation, and p-n junction 212-2 is forward-biased during operation, when the entire series 216 is connected across a suitable DC biasing voltage source. Thus, p-n junctions 212-1 and 212-3 contribute to modulation when reverse-biased, while p-n junction 212-2 does not contribute to modulation. Although the series 216 of lateral p-n junctions includes two lateral p-n junctions 212 of the same p-n orientation as shown in FIG. 2, the series 216 may have more lateral p-n junction of the same p-n orientation in other embodiments.

In an embodiment, a geometry of Si optical waveguide 102 comprises a rib optical waveguide 230. The dimensions of Si optical core 208 as a rib optical waveguide 230 include a rib width 232, a total optical core thickness 234, and a rib height 236. For example, the rib width 232 may be equal to or less than about 500 nanometers (nm), the total optical core thickness 234 may be equal to or less than about 220 nm, and rib height 236 may be in the range of about 80-120 nm, although other dimensions are considered herein. The lateral p-n junctions 212 are disposed or arranged in series across the rib width 232 in the Si optical core 208.

For a lateral p-n junction 212, a p-type region contains an excess of holes, while an n-type region contains an excess of electrons. At or near a lateral p-n junction 212, electrons may diffuse across to combine with holes creating a substantial "depletion region" in response to reverse-biasing. FIG. 3 schematically illustrates electrical operation of Si optical phase shifter 100 in FIG. 2, where a first depletion region 310 is formed at lateral p-n junction 212-1, and a second depletion region 311 is formed at lateral p-n junction 212-3. The first depletion region 310 and the second depletion region 311 are offset from the lateral center 318 (i.e., along the x-axis) of Si optical core 208. Carrier density variations are responsible for refractive index variations in Si optical waveguide 102. Thus, the phase of an optical signal propagating through Si optical waveguide 102 may be modulated by changing the carrier densities at the reversed-biased lateral p-n junctions 212.

In FIG. 4, carrier densities are represented by the width 440 of the depletion regions 310-311 at the lateral p-n junctions 212. During operation, the width 440 may be adjusted by applying a varying reverse-biasing voltage from a voltage source 450 across the series 216 of lateral p-n junctions 212. As is clear from FIG. 4, such biasing also causes the second p-n junction 212-2 to be forward-biased. Si optical phase shifter 100 further includes biasing electrodes 416-417 configured to electrically couple static (DC) voltage source 450 across the entire series 216 of p-n junctions 212 in Si optical core 208. Electrodes 416-417 are located along opposite sides of a segment 430 of Si optical core 208. Electrode 416 is electrically coupled via a heavily p-type doped (p++) portion of a Si slab 420 to the first p-type region 220. Electrode 417 is electrically coupled via a heavily n-type doped (n++) portion of a Si slab 421 to the second n-type region 226.

Figure 5:
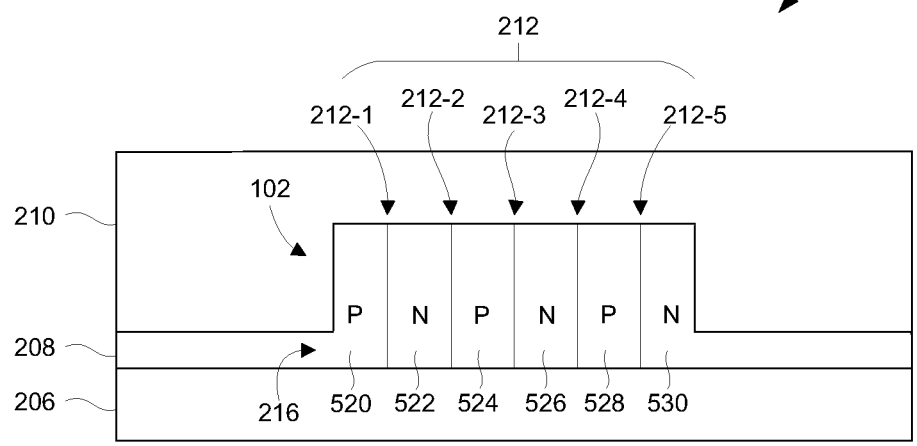
FIGS. 5-7 are cross-sectional views of a Si optical phase shifter in an illustrative embodiment.
Figure 6:
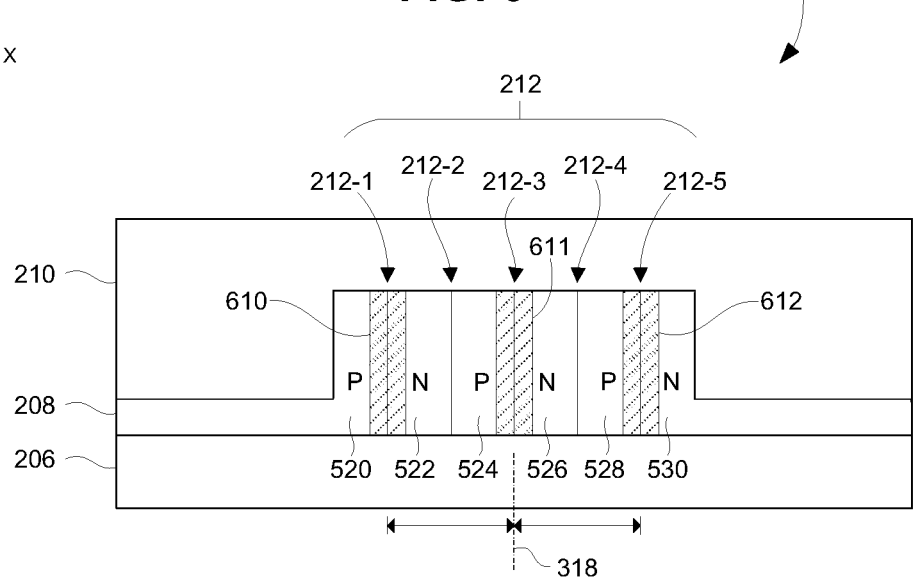
Figure 7:
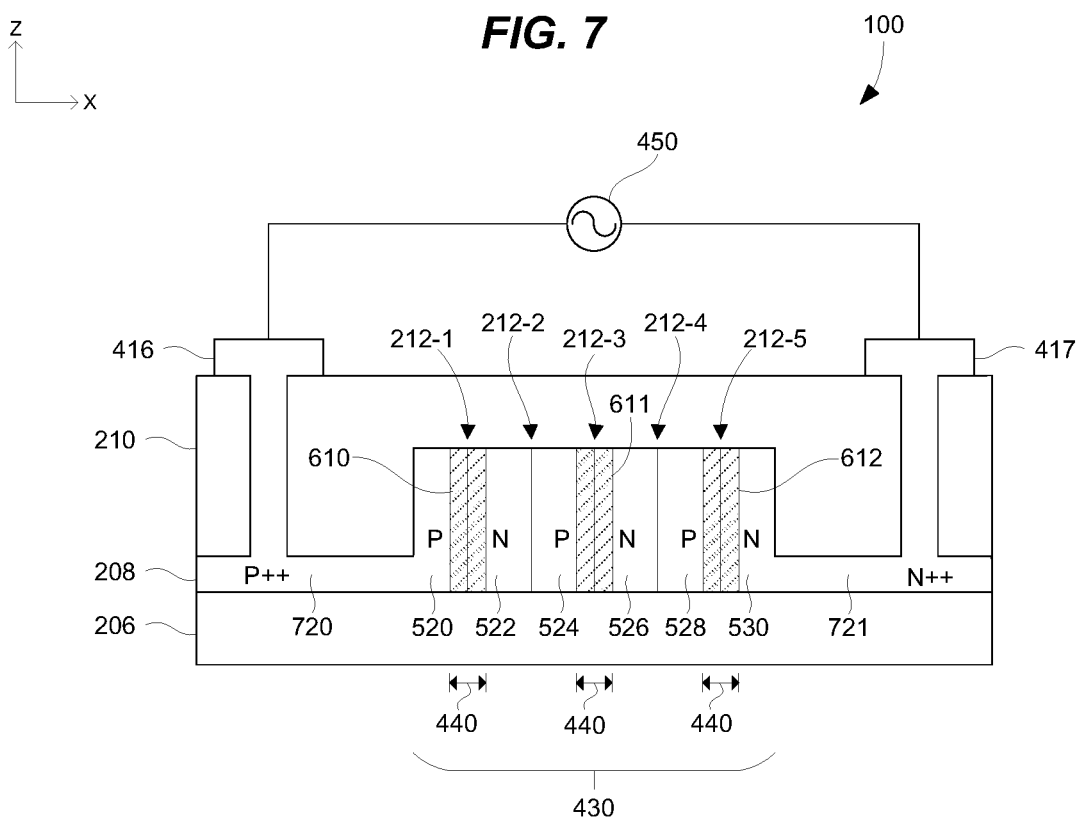

FIGS. 5-7 are cross-sectional views of Si optical phase shifter 100 in an illustrative embodiment. The views in FIGS. 5-7 are across a transverse cut plane A-A (e.g., along the x-axis) as shown in FIG. 1. As above, Si optical waveguide 102 of Si optical phase shifter 100 includes lower optical cladding layer 206, Si optical core 208, and upper optical cladding 210 in the vertical direction along the z-axis. Additional elements of Si optical phase shifter 100 may be incorporated as desired. Also, FIGS. 5-7 are not drawn to scale.

In FIG. 5, Si optical phase shifter 100 includes a plurality of lateral p-n junctions 212 embedded in Si optical waveguide 102. In an embodiment, five lateral p-n junctions 212 (i.e., first, second, third, fourth, and fifth lateral p-n junctions 212-1, 212-2, 212-3, 212-4, and 212-5) are located in a series 216 across a width of Si optical core 208. The lateral p-n junctions 212 are created by doping the crystalline Si material of the Si optical core 208. The doping creates a first p-type region 520 and a first n-type region 522, creates a second p-type region 524 and a second n-type region 526, and creates a third p-type region 528 and a third n-type region 530. The doping creates three lateral p-n junctions 212-1, 212-3, and 212-5 of the same orientation, and two other p-n junctions 212-2 and 212-4 oppositely oriented. Lateral p-n junctions 212-1, 212-3, and 212-5 are reverse-biased during operation, and p-n junctions 212-2 and 212-4 are forward-biased during operation, when the entire series 216 is connected across a suitable DC biasing voltage source. Thus, p-n junctions 212-1, 212-3, and 212-5 contribute to modulation when reverse-biased, while p-n junctions 212-2 and 212-4 do not contribute to modulation. Although the series 216 of lateral p-n junctions 212 includes three lateral p-n junctions 212 of the same p-n orientation in Si optical core 208 as shown in FIG. 5, the series 216 may have more lateral p-n junctions 212 of the same p-n orientation in other embodiments.

FIG. 6 schematically illustrates electrical operation of Si optical phase shifter 100 in FIG. 5, where a first depletion region 610 is formed at lateral p-n junction 212-1, a second depletion region 611 is formed at lateral p-n junction 212-3, and a third depletion region 612 is formed at lateral p-n junction 212-5. The first depletion region 610 and the third depletion region 612 are offset from the lateral center 318 (i.e., along the x-axis) of Si optical core 208, while the second depletion region 611 is generally aligned with the lateral center 318.

In FIG. 7, carrier densities are represented by the width 440 of the depletion regions 610-612 at the lateral p-n junctions 212. During operation, the width 440 may be adjusted by applying a varying reverse-biasing voltage from a voltage source 450 across the series 216 of lateral p-n junctions 212. As is clear from FIG. 7, such biasing also causes the p-n junctions 212-2 and 212-4 to be forward-biased. Si optical phase shifter 100 further includes biasing electrodes 416-417 configured to electrically couple with voltage source 450 across the entire series 216 of p-n junctions 212 in Si optical core 208. Electrodes 416-417 are located along opposite sides of a segment 430 of Si optical core 208. Electrode 416 is electrically coupled via a heavily p-type doped (p++) portion of a Si slab 720 to the first p-type region 520. Electrode 417 is electrically coupled via a heavily n-type doped (n++) portion of a Si slab 721 to the third n-type region 530.

Figure 8:
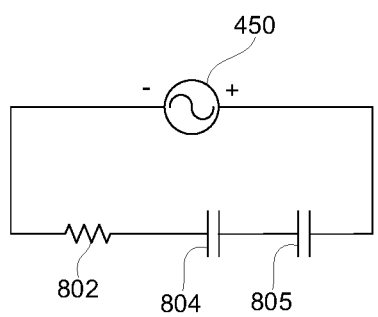
FIGS. 8-9 are schematic diagrams of a Si optical waveguide in an illustrative embodiment.
Figure 9:
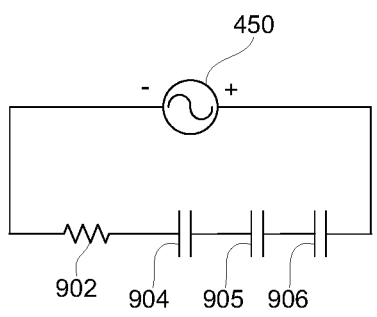

One technical benefit of the configurations of a Si optical phase shifter 100 as discussed above is a lower capacitance is realized in the Si optical waveguide 102 while maintaining optical phase modulation efficiency. FIGS. 8-9 are schematic diagrams of Si optical waveguide 102 in an illustrative embodiment. FIG. 8 is a schematic diagram functionally illustrating electrical properties of the Si optical waveguide 102 shown in FIG. 4. During operation, resistor 802 represents the resistance across the Si optical core 208. There is a capacitance between p-type and n-type regions of each reverse-biased p-n junction 212. Thus, capacitor 804 represents the capacitance of reverse-biased p-n junction 212-1, and capacitor 805 represents the capacitance of reverse-biased p-n junction 212-3 (see also, FIG. 4). The total capacitance of N capacitors in series is the inverse of the sum of the inverse of the individual capacitances. If, for example, two equal-valued capacitors are in series, the total capacitance is half of their value. Thus, when the capacitances of reverse-biased p-n junction 212-1 and p-n junction 212-3 are about equal, the total capacitance of the Si optical waveguide 102 is about half the capacitance of a single one of the reverse-biased p-n junctions 212. As shown in FIG. 4, the two lateral p-n junctions 212, which are reverse-biased in operation, are offset from the lateral center 318 of Si optical core 208 where optical intensity may typically be maximum, and the modulation efficiency may be somewhat lower than a design with a single p-n junction aligned with the lateral center 318. However, the smaller capacitance across the Si optical core 208 can provide an advantage over a design with a single p-n junction, especially at higher frequencies.

FIG. 9 is a schematic diagram functionally illustrating electrical properties of the Si optical waveguide 102 shown in FIG. 7. Again, during operation, resistor 902 represents the resistance across the Si optical core 208. Capacitor 904 represents the capacitance of reverse-biased p-n junction 212-1, capacitor 905 represents the capacitance of reverse-biased p-n junction 212-3, and capacitor 906 represents the capacitance of reverse-biased p-n junction 212-5 (see also, FIG. 7). As shown in FIG. 7, reverse-biased p-n junction 212-3 is approximately aligned with the lateral center 318 of Si optical core 208 where optical intensity may typically be maximum, and reverse-biased p-n junctions 212-1 and 212-5 are offset from the lateral center 318. The modulation efficiency may therefore be similar to a design with a single p-n junction aligned with the lateral center 318, but the smaller capacitance provides an advantage over a design with a single p-n junction, especially at higher frequencies.

FIG. 10 is a flow chart illustrating a method 1000 of fabricating a Si optical phase shifter in an illustrative embodiment. The steps of the flow charts described herein are not all inclusive and may include other steps not shown, and the steps may be performed in an alternative order. FIGS. 11-14 illustrate results of the fabrication steps in illustrative embodiments.

Figure 12:
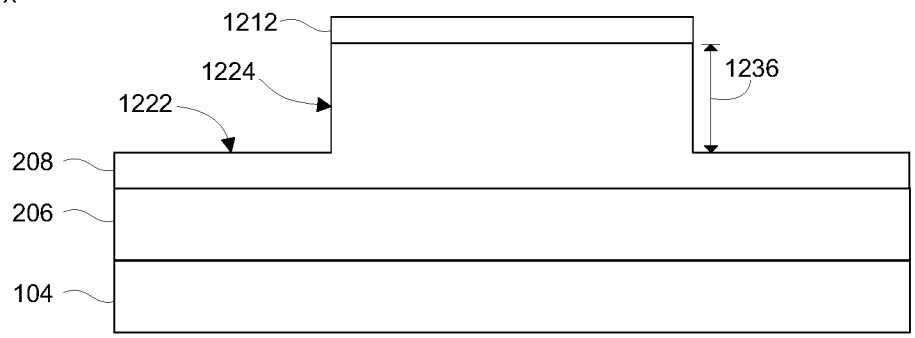

Method 1000 includes the step of acquiring or obtaining a Si substrate 104 (step 1002). In FIG. 11, the Si substrate 104 includes a crystalline Si layer 1108 formed on a lower optical cladding layer 206. For example, an SOI wafer 1140 may be acquired having a crystalline Si layer (or device layer) of about 220 nm. In FIG. 10, method 1000 further includes etching the crystalline Si layer 1108 to form a Si optical core 208 of a Si optical waveguide 102 (step 1004). In FIG. 12, for example, a resist 1212 may be patterned on the top surface 1118 of the crystalline Si layer 1108 (see FIG. 11), and an etching process is performed (e.g., reactive ion etching process) to remove material from the crystalline Si layer 1108 down to an etching depth 1236. The etching process forms the Si optical core 208 of the Si optical waveguide 102. In this embodiment, the Si optical waveguide 102 has a geometry of a rib waveguide with a slab 1222 and a rib 1224.

Figure 13:
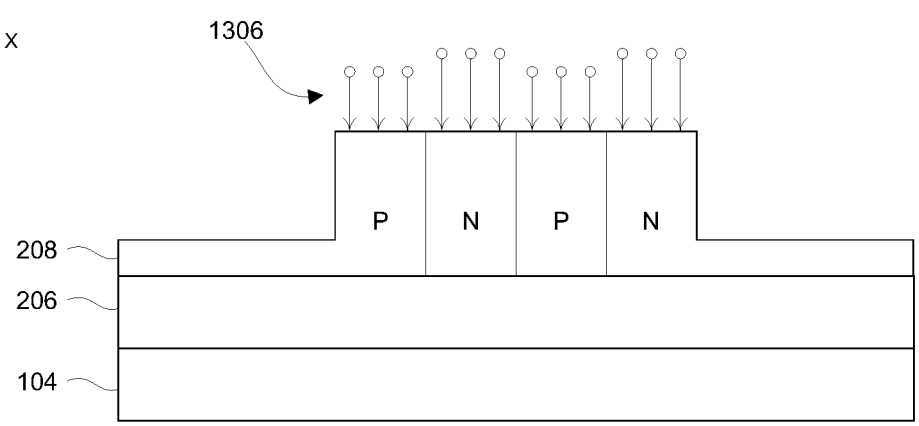
Figure 14:
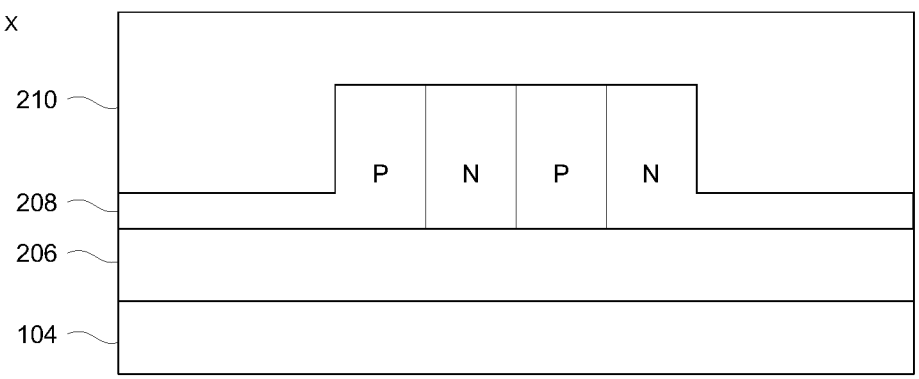

In FIG. 10, method 1000 further includes doping the Si optical core 208 to form a plurality of lateral p-n junctions 212 in the Si optical waveguide 102 (step 1006). In FIG. 13, with the resist 1212 removed, an ion implantation process 1306 or similar process may be performed to create p-type regions and n-type regions in the Si optical core 208 that form a series of lateral p-n junctions 212. Although three lateral p-n junctions 212 are illustrated in FIG. 13, more than three lateral p-n junctions 212 may be formed (see FIG. 5). In FIG. 10, method 1000 further includes forming an upper optical cladding 210 of the Si optical waveguide 102 on the Si optical core 208 (step 1008). In FIG. 14, the upper optical cladding 210 may be formed by depositing a Si material having a lower refractive index than the Si optical core 208, such as silicon dioxide. In FIG. 10, method 1000 further includes forming a pair of biasing electrodes 416-417 along opposite sides of a segment 430 of Si optical core 208 (step 1010), as shown in FIG. 4.

Method 1000 may be performed in multiple areas of a Si substrate 104 to fabricate multiple Si optical phase shifters.

Figure 15:
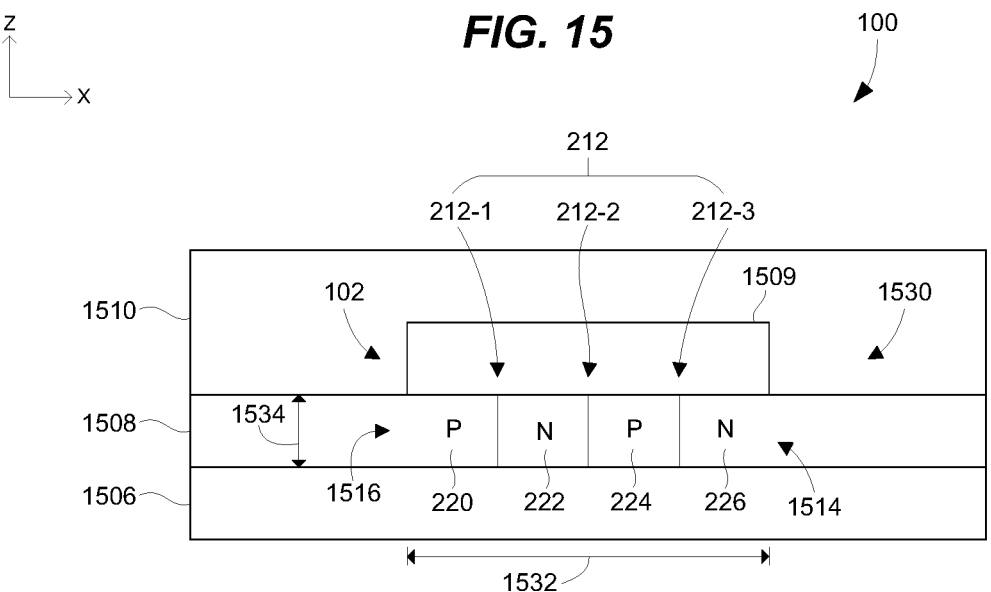
Figure 16:
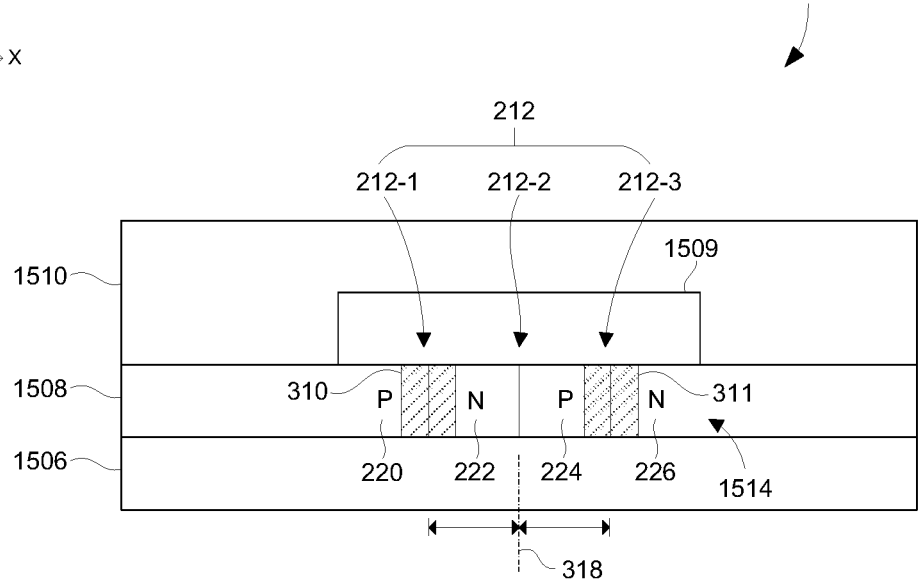

FIGS. 15-17 are cross-sectional views of Si optical phase shifter 100 in an illustrative embodiment. The views in FIGS. 15-17 are across a transverse cut plane A-A (e.g., along the x-axis) as shown in FIG. 1. The Si optical waveguide 102 of Si optical phase shifter 100 includes a lower optical cladding layer 1506, a Si or hybrid-material optical core 1514 formed by Si layer 1508 and a light-guiding rib 1509, and an upper optical cladding 1510 in the vertical direction along the z-axis. Lower optical cladding layer 1506 may comprise a layer of silicon dioxide (e.g., $SiO_2$), such as a silicon buried oxide (BOX), or another type of dielectric that acts as a lower optical cladding for optical core 1514. The Si or hybrid optical core 1514 has a Si overlayer 1508 in contact with the lower optical cladding layer 1506 that has a higher refractive index. The light-guiding rib 1509 may be a Si layer, to produce a Si optical core 1514, or may be, e.g., a silicon nitride layer (SiN), that has a lower refractive index than silicon to produce a hybrid optical core 1514. In the hybrid case, the light-guiding rib 1509 has a lower refractive index than Si layer 1508 and a higher refractive index than upper optical cladding 1510. The upper optical cladding 1510 may comprise a layer of silicon dioxide or another dielectric in contact with the Si layer 1508 that has a lower refractive index. Additional elements of Si optical phase shifter 100 may be incorporated as desired. Also, FIGS. 15-17 are not drawn to scale.

In FIG. 15, Si optical phase shifter 100 includes a series 1516 of lateral p-n junctions 212 in optical core 1514, where the series 1516 extends perpendicular to the light propagation direction 132 in Si optical waveguide 102, e.g., the p-n junctions 212 may approximately form a stack perpendicular to the light propagation direction 132. In an embodiment, three lateral p-n junctions 212 (i.e., first, second, and third lateral p-n junctions 212-1, 212-2, and 212-3) are located in a series 1516 across a width of Si layer 1508. The lateral p-n junctions 212 are created by doping the crystalline Si material of the Si layer 1508. The doping creates a first p-type region 220 and a first n-type region 222, and creates a second p-type region 224 and a second n-type region 226. The doping creates two lateral p-n junctions 212-1 and 212-3 of the same orientation, and another p-n junction 212-2 oppositely oriented. Lateral p-n junctions 212-1 and 212-3 are reverse-biased during operation, and p-n junction 212-2 is forward-biased during operation, when the entire series 1516 is connected across a suitable DC biasing voltage source. Thus, p-n junctions 212-1 and 212-3 contribute to modulation when reverse-biased, while p-n junction 212-2 does not contribute to modulation. Although the series 1516 of lateral p-n junctions includes two lateral p-n junctions 212 of the same p-n orientation in Si layer 1508 as shown in FIG. 15, the series 1516 may have more lateral p-n junctions of the same p-n orientation in other embodiments.

In an embodiment, a geometry of Si optical waveguide 102 comprises a strip-loaded waveguide 1530. The dimensions of Si optical waveguide 102 as a strip-loaded waveguide 1530 include a width 1532 of the light-guiding rib 1509, and a height 1534 of the Si layer 1508. For example, the width 1532 may be equal to or less than about 500 nm, and the height 1534 may be equal to or less than about 110 nm, although other dimensions are considered herein. The lateral p-n junctions 212 may be arranged in series 1516 in the portion of optical core 1514 facing the light-guiding rib 1509.

For a lateral p-n junction 212, a p-type region contains an excess of holes, while an n-type region contains an excess of electrons. At or near the lateral p-n junction 212, electrons may diffuse across to combine with holes creating a substantial "depletion region" in response to reverse-biasing. FIG. 16 schematically illustrates electrical operation of Si optical phase shifter 100 in FIG. 15, where a first depletion region 310 is formed at lateral p-n junction 212-1, and a second depletion region 311 is formed at lateral p-n junction 212-3. The first depletion region 310 and the second depletion region 311 are offset from the lateral center 318 (i.e., along the x-axis) of optical core 1514. Carrier density variations are responsible for refractive index variations in Si optical waveguide 102. Thus, the phase of an optical signal propagating through Si optical waveguide 102 may be modulated by changing the carrier densities at the reverse-biased lateral p-n junctions 212.

In FIG. 17, carrier densities are represented by the width 440 of the depletion regions 310-311 at the lateral p-n junctions 212. During operation, the width 440 may be adjusted by applying a varying reverse-biasing voltage from a voltage source 450 across the series 1516 of lateral p-n junctions 212. As is clear from FIG. 17, such biasing also causes p-n junction 212-2 to be forward-biased. Si optical phase shifter 100 further includes biasing electrodes 416-417 configured to electrically couple voltage source 450 across the entire series 1516 of p-n junctions 212 in optical core 1514. Electrodes 416-417 are located along opposite sides of a segment 430 of optical core 1514. Electrode 416 is electrically coupled via a heavily p-type doped (p++) portion of a Si slab 1720 to the first p-type region 220. Electrode 417 is electrically coupled via a heavily n-type doped (n++) portion of a Si slab 1721 to the second n-type region 226.

Figure 19:
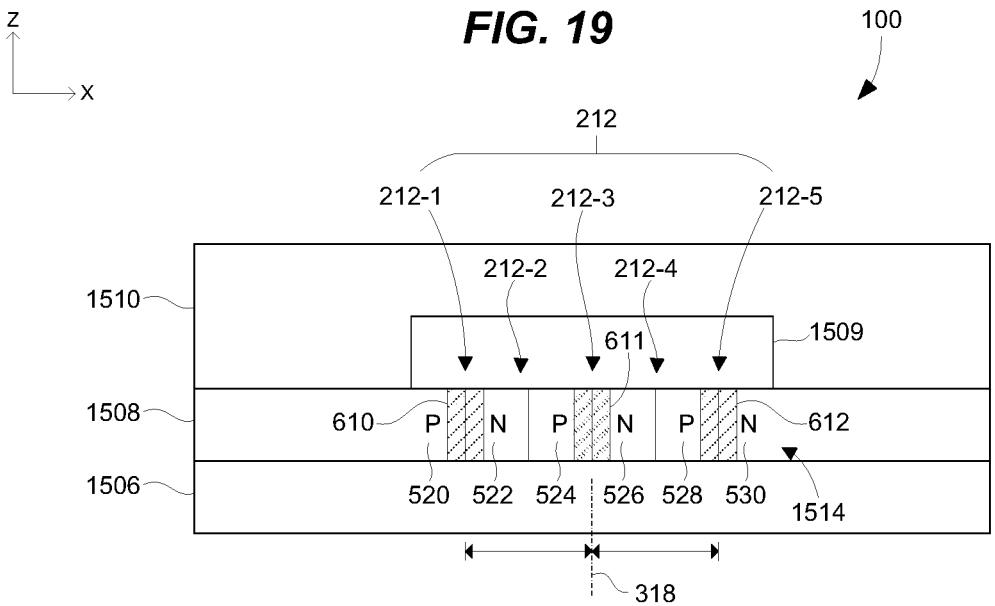
Figure 20:
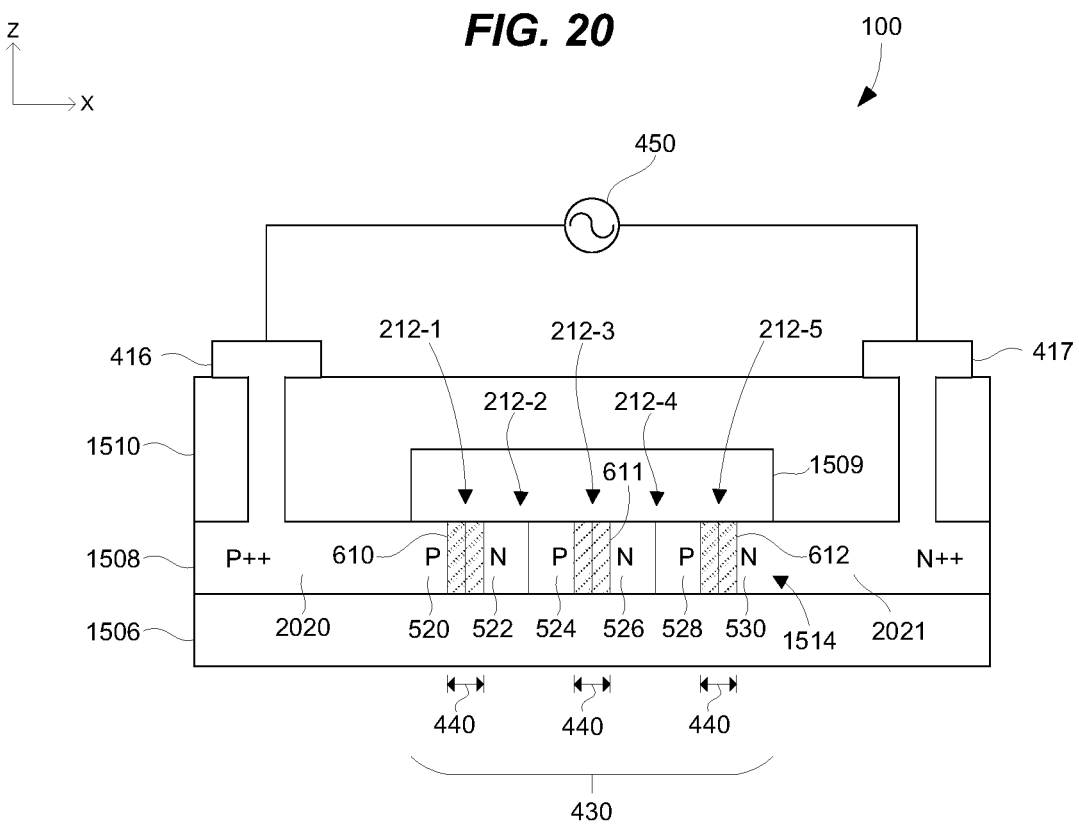

FIGS. 18-20 are cross-sectional views of Si optical phase shifter 100 in an illustrative embodiment. The views in FIGS. 18-20 are across a transverse cut plane A-A (e.g., along the x-axis) as shown in FIG. 1. As above, Si optical waveguide 102 of Si optical phase shifter 100 includes lower optical cladding layer 1506, a Si or hybrid-material optical core 1514 formed by Si layer 1508 and a light-guiding rib 1509, and upper optical cladding 1510 in the vertical direction along the z-axis. Additional elements of Si optical phase shifter 100 may be incorporated as desired. Also, FIGS. 18-20 are not drawn to scale.

In FIG. 18, Si optical phase shifter 100 includes a series 1516 of lateral p-n junctions 212 in optical core 1514. In an embodiment, five lateral p-n junctions 212 (i.e., first, second, third, fourth, and fifth lateral p-n junction 212-1, 212-2, 212-3, 212-4, and 212-5) are located in a series 1516 across a width of Si layer 1508. The lateral p-n junctions 212 are created by doping the crystalline Si material of the Si layer 1508. The doping creates a first p-type region 520 and a first n-type region 522, creates a second p-type region 524 and a second n-type region 526, and creates a third p-type region 528 and a third n-type region 530. The doping creates three lateral p-n junctions 212-1, 212-3, and 212-5 of the same orientation, and two other p-n junctions 212-2 and 212-4 oppositely oriented. Lateral p-n junctions 212-1, 212-3, and 212-5 are reverse-biased during operation, and p-n junctions 212-2 and 212-4 are forward-biased during operation, when the entire series 1516 is connected across a suitable DC biasing voltage source. Thus, p-n junctions 212-1, 212-3, and 212-5 contribute to modulation when reverse-biased, while p-n junctions 212-2 and 212-4 do not contribute to modulation. Although the series 1516 of lateral p-n junctions 212 includes three lateral p-n junctions 212 of the same p-n orientation in Si layer 1508 shown in FIG. 18, the series 1516 may have more lateral p-n junctions 212 of the same p-n orientation in other embodiments.

FIG. 19 schematically illustrates electrical operation of Si optical phase shifter 100 in FIG. 18, where a first depletion region 610 is formed at lateral p-n junction 212-1, a second depletion region 611 is formed at lateral p-n junction 212-3, and a third depletion region 612 is formed at lateral p-n junction 212-5. The first depletion region 610 and the third depletion region 612 are offset from the lateral center 318 (i.e., along the x-axis) of optical core 1514, while the second depletion region 611 is generally aligned with the lateral center 318.

In FIG. 20, carrier densities are represented by the width 440 of the depletion regions 610-612 at the lateral p-n junctions 212. During operation, the width 440 may be adjusted by applying a varying reverse-biasing voltage from a voltage source 450 across the series 1516 of lateral p-n junctions 212. As is clear from FIG. 20, such biasing also causes the p-n junctions 212-2 and 212-4 to be forward-biased. Si optical phase shifter 100 further includes biasing electrodes 416-417 configured to electrically couple voltage source 450 across the entire series 1516 of p-n junctions 212 in optical core 1514. Electrodes 416-417 are located along opposite sides of a segment 430 of Si optical core 208. Electrode 416 is electrically coupled via a heavily p-type doped (p++) portion of a Si slab 2020 to the first p-type region 520. Electrode 417 is electrically coupled via a heavily n-type doped (n++) portion of a Si slab 2021 to the third n-type region 530.

Figure 21:
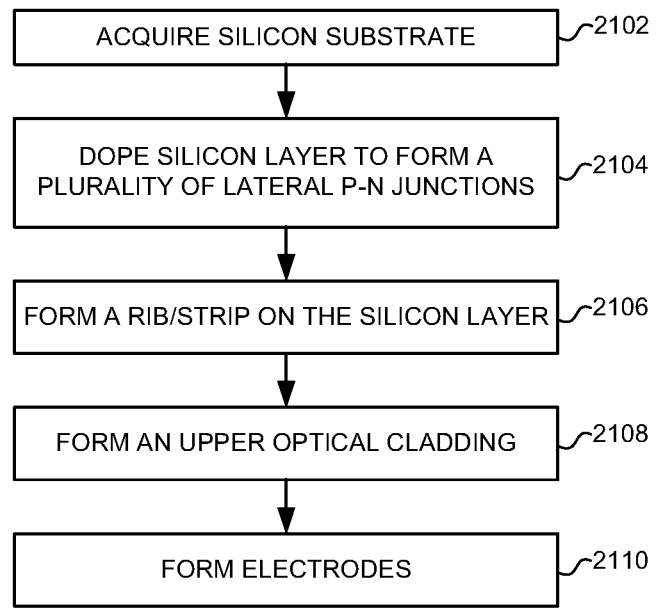
FIG. 21 is a flow chart illustrating a method of fabricating a Si optical phase shifter in an illustrative embodiment.

FIG. 21 is a flow chart illustrating a method 2100 of fabricating a Si optical phase shifter in an illustrative embodiment. FIGS. 22-25 illustrate results of the fabrication steps in illustrative embodiments.

Figure 22:
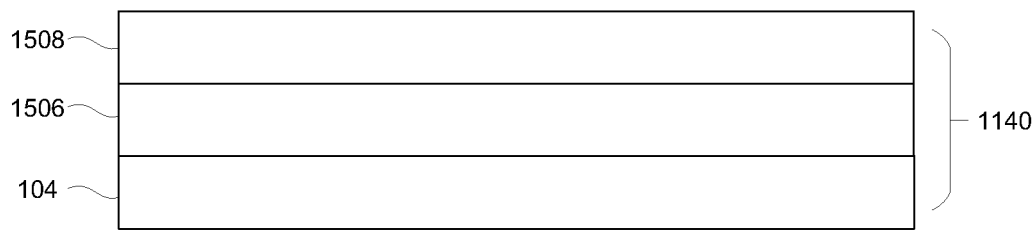
FIGS. 22-25 illustrate results of fabrication steps of the method in FIG. 21 in illustrative embodiments.
Figure 23:
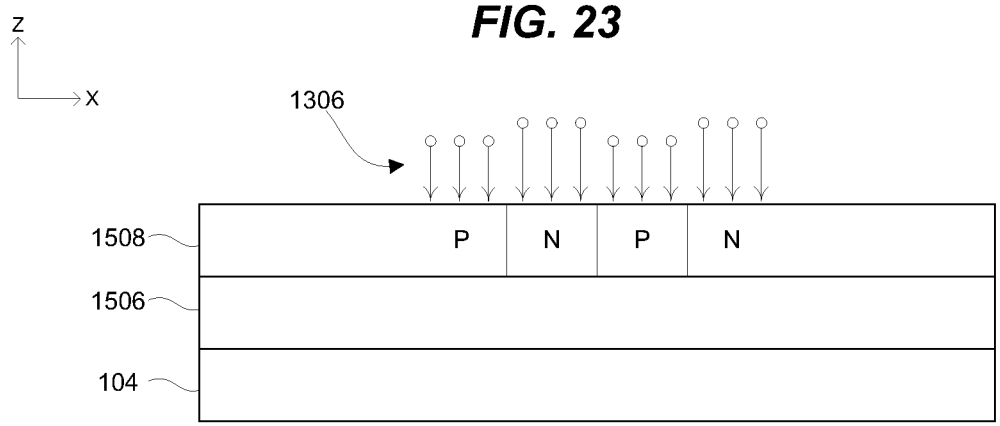

Method 2100 includes the step of acquiring or obtaining a Si substrate 104 (step 2102). In FIG. 22, the Si substrate 104 includes a crystalline Si layer 1508 formed on a lower optical cladding layer 1506. For example, an SOI wafer 1140 may be acquired having a crystalline Si layer (or device layer) of about 220 nm. In FIG. 21, a portion of the crystalline Si layer 1508 underneath the light-guiding rib 1509 (see FIG. 15) represents the optical core 1514 of the Si optical waveguide 102. Thus, method 2100 further includes doping the crystalline Si layer 1508 (i.e., the optical core 1514) to form a plurality of lateral p-n junctions 212 (step 2104). In FIG. 23, an ion implantation process 1306 or similar process may be performed to create p-type regions and n-type regions in the crystalline Si layer 1508 that form a series of lateral p-n junctions. Although three lateral p-n junctions are illustrated in FIG. 23, more than three lateral p-n junctions may be formed (see FIG. 18).

Figure 24:
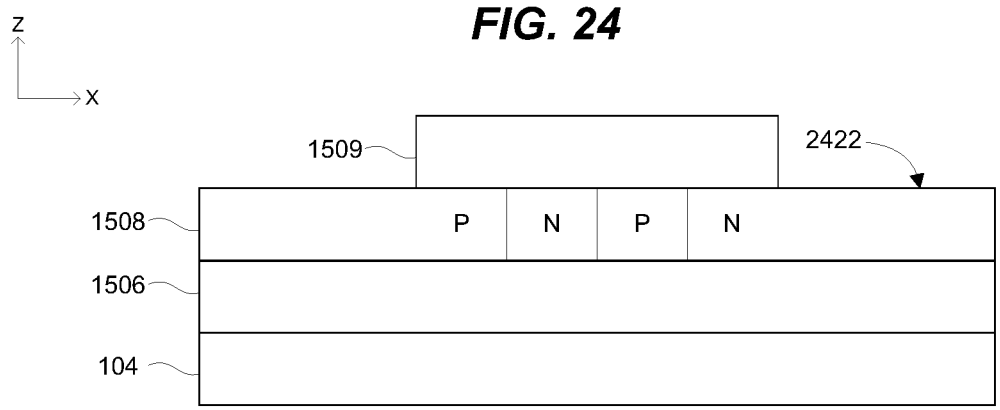
Figure 25:
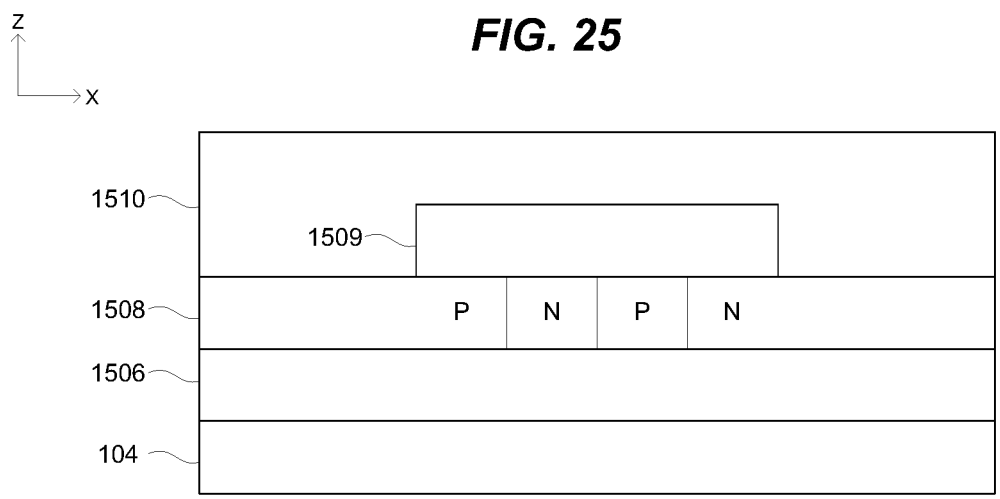

In FIG. 21, method 2100 further includes forming a light-guiding rib 1509 on the Si layer 1508 (step 2106). FIG. 24 illustrates a light-guiding rib 1509 formed on the Si layer 1508. For example, light-guiding rib 1509 may be formed by depositing a Si layer that has a lower refractive index than the Si layer 1508, but a higher refractive index than the upper optical cladding 1510, such as silicon nitride (SiN). In this embodiment, the Si optical waveguide 102 has a geometry of a strip-loaded waveguide with a slab 2422 comprising the optical core 1514, and the light-guiding rib 1509. In FIG. 21, method 2100 further includes forming upper optical cladding 1510 of the Si optical waveguide 102 on the Si layer 1508 and the light-guiding rib 1509 (step 2108). In FIG. 25, the upper optical cladding 1510 may be formed by depositing a Si material having a lower refractive index than the Si layer 1508 and the light-guiding rib 1509, such as silicon dioxide. In FIG. 21, method 2100 further includes forming a pair of biasing electrodes 416-417 along opposite sides of a segment 430 of the optical core 1514 (step 2110), as shown in FIG. 20.

Method 2100 may be performed in multiple areas of a Si substrate 104 to fabricate multiple Si optical phase shifters.

Figure 26:
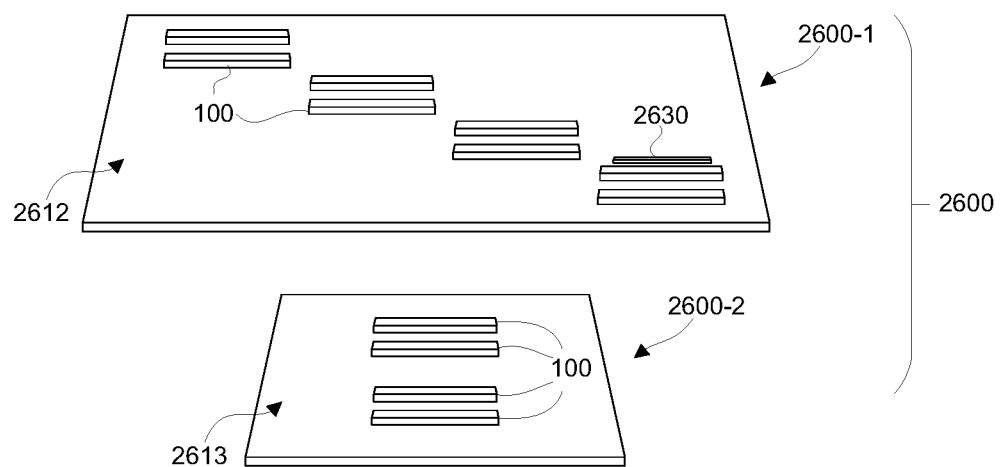
FIG. 26 illustrates optical devices that implement one or more Si optical phase shifters in an illustrative embodiment.

One or more Si optical phase shifters 100 as disclosed above may be used in a variety of optical devices. FIG. 26 illustrates optical devices 2600 that implement one or more Si optical phase shifters 100 in an illustrative embodiment. In general, an optical device 2600 is an apparatus configured to process light or optical waves. Optical device 2600-1, for example, may comprise a coherent optical module 2612 (e.g., a coherent optical transmitter or a coherent optical transceiver) that implements one or more Si optical phase shifters 100. Optical device 2600-2, for example, may comprise an optical modulator 2613 that implements one or more Si optical phase shifters 100 for data modulation of optical carrier(s). An optical modulator 2613 is a type of optical device that manipulates a property of light, such as a radio-frequency traveling wave operated Mach-Zehnder Modulator (MZM), a ring resonator MZM, an optical ring resonator, etc.

As illustrated in FIG. 26, an Si optical phase shifter 100 may include one or more radio-frequency (RF) traveling-wave electrodes 2630 to operate the Si optical phase shifter 100.

Figure 27:
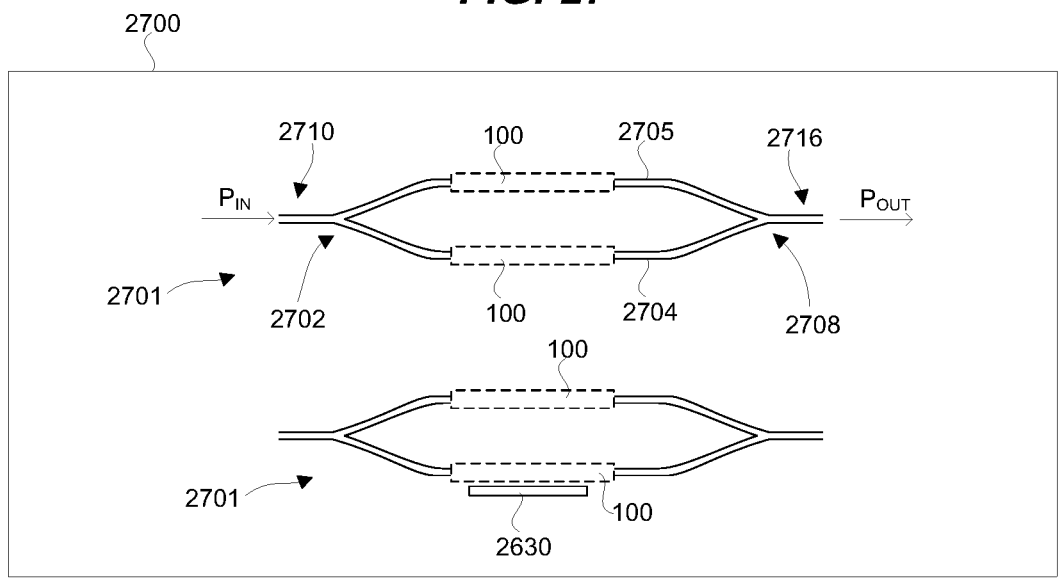
FIG. 27 illustrates an optical device that implements one or more Si Mach-Zehnder Modulators (MZM) in an illustrative embodiment.

One or more of optical devices 2600, or other optical devices, may include or implement a Si MZM. FIG. 27 illustrates an optical device 2700 that implements one or more Si MZMs 2701 in an illustrative embodiment. Although two Si MZMs 2701 are shown in FIG. 27, more or less Si MZMs 2701 may be implemented in other embodiments.

A Si MZM 2701 includes an optical splitter 2702, a pair of optical modulation, waveguide arms 2704-2705, and an optical combiner 2708. Input power (PIN) from a laser (not shown) is launched into an input port 2710, and is split at optical splitter 2702 to be shared by optical modulation, waveguide arm 2704 and optical modulation, waveguide arm 2705 (e.g., the power splitting may cause about equal amounts of the light from input port 2710 to be directed to each of the optical modulation arms 2704 and 2705). One or both of the optical modulation, waveguide arms 2704-2705 has one or more segments therealong that implement(s) a Si optical phase shifter 100 as described above. A negative-bias voltage is applied across a Si optical phase shifter 100 via biasing electrodes (e.g., see FIG. 4), and an RF modulation signal may be applied across a Si optical phase shifter 100 via one or more RF traveling-wave electrodes 2630 to alter the optical refractive index of the segment and change a phase shift accumulated by the light propagating therethrough. Optical combiner 2708 combines the light from the two optical modulation, waveguide arms 2704-2705. In the optical combiner 2708, the light from the optical modulation, waveguide arms 2704-2705 constructively or destructively interferes depending on an accumulated phase difference between the light from the different optical modulation arms 2704-2705, e.g., to provide amplitude modulation of the output light ($P_{OUT}$) at output port 2716. In embodiments having, e.g., nested pairs of two such MZM optical modulators, output optical combiner 2708 can output light having separate in-phase and quadrature-phase modulation.

Figure 28:
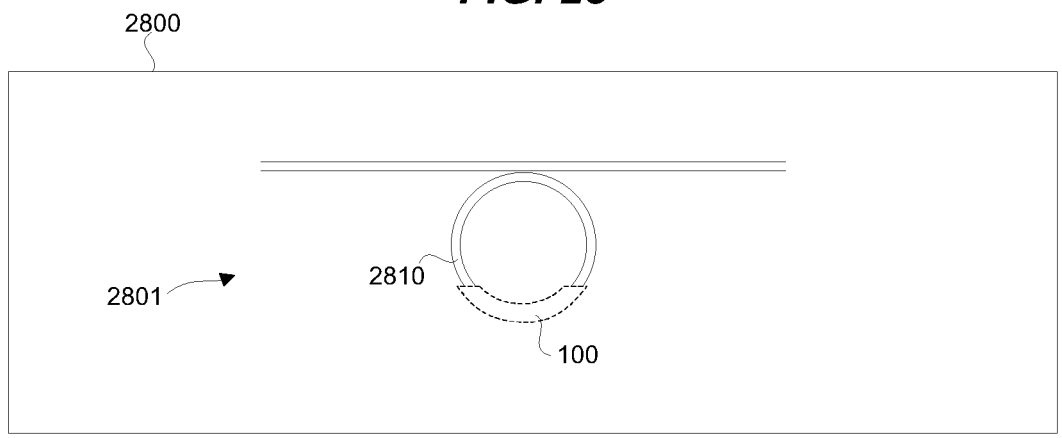
FIG. 28 illustrates an optical device that implements one or more optical ring resonators in an illustrative embodiment.

One or more of optical devices 2600, or other optical devices, may include or implement an optical ring resonator or a ring resonator MZM. FIG. 28 illustrates an optical device 2800 that implements one or more optical ring resonators 2801 in an illustrative embodiment. A Si optical phase shifter 100 may be implemented along an optical waveguide segment 2810 of optical ring resonator 2801.

Although specific embodiments were described herein, the scope of the disclosure is not limited to those specific embodiments. The scope of the disclosure is defined by the following claims and any equivalents thereof.

What is claimed is:
1. An apparatus, comprising:
an optical phase shifter comprising:
a planar optical waveguide having a silicon optical core and a geometry of a rib waveguide, wherein dimensions of the silicon optical core as the rib waveguide include a rib width and a core thickness; and
a pair of biasing electrodes located along opposite sides of a segment of the silicon optical core;
wherein the segment of the silicon optical core comprises a series of p-n junctions, the series extending in a direction transverse to an optical propagation direction of an optical signal and across the rib width of the silicon optical core in a segment of the planar optical waveguide including the segment of the silicon optical core;
wherein at least two of the p-n junctions are configured to be reverse biased by applying a voltage across the biasing electrodes;
wherein the optical phase shifter is configured to control a phase of the optical signal propagating through the planar optical waveguide by changing carrier densities at the at least two of the p-n junctions, due to varying the voltage, to alter a refractive index of the planar optical waveguide;
wherein the at least two of the p-n junctions comprise two reverse-biased p-n junctions offset from a lateral center of the silicon optical core in the segment thereof, and a single reverse-biased p-n junction aligned with the lateral center.

2. The apparatus of claim 1, wherein at least another of the p-n junctions is located between the two of the p-n junctions and is configured to be forward biased by applying the voltage across the biasing electrodes.

3. The apparatus of claim 1, further comprising at least one radio-frequency traveling-wave electrode to operate the optical phase shifter.

4. The apparatus of claim 1, further comprising a Mach-Zehnder optical modulator having a parallel pair of optical waveguide arms;
wherein the optical phase shifter is along one of the optical waveguide arms.

5. The apparatus of claim 4, further comprising at least one radio-frequency traveling-wave electrode configured to operate the optical phase shifter.

6. The apparatus of claim 1, wherein the two reverse-biased p-n junctions are located on opposites sides of the lateral center of the silicon optical core in the segment thereof.

7. The apparatus of claim 1, wherein:
the optical phase shifter is formed on a substrate; and
the p-n junctions of the silicon optical core are oriented in a vertical direction transverse to the substrate.

8. The apparatus of claim 7, wherein:
the optical phase shifter is formed on a silicon-on-insulator wafer having an insulating layer between a silicon layer and the substrate.

9. The apparatus of claim 1, wherein:
the planar optical waveguide includes a lower optical cladding layer, the silicon optical core, and an upper optical cladding; and
the p-n junctions of the silicon optical core are oriented in a vertical direction between the lower optical cladding layer and the upper optical cladding.

10. The apparatus of claim 1, wherein:
the series comprises three of the p-n junctions configured to be reverse biased by applying the voltage across the biasing electrodes.

11. An apparatus, comprising:
a Mach-Zehnder optical modulator having a parallel pair of optical waveguide arms;
wherein an optical phase shifter is along one of the optical waveguide arms, the optical phase shifter comprising:
a planar optical waveguide having a silicon optical core and a geometry of a rib waveguide, wherein dimensions of the silicon optical core as the rib waveguide include a rib width and a core thickness; and
a pair of biasing electrodes located along opposite sides of a segment of the silicon optical core;
wherein the segment of the silicon optical core comprises a series of p-n junctions, the series extending in a direction transverse to an optical propagation direction of an optical signal and across the rib width of the silicon optical core in a segment of the planar optical waveguide including the segment of the silicon optical core;

wherein the series comprises at least three of the p-n junctions configured to be reverse biased by applying a voltage across the biasing electrodes;

wherein the optical phase shifter is configured to control a phase of the optical signal propagating through the planar optical waveguide by changing carrier densities at the at least three of the p-n junctions, due to varying the voltage, to alter a refractive index of the planar optical waveguide.

12. The apparatus of claim 11, wherein at least another of the p-n junctions is located between the two of the p-n junctions and is configured to be forward biased by applying the voltage across the biasing electrodes.

13. The apparatus of claim 11, further comprising:
at least one radio-frequency traveling-wave electrode configured to operate the optical phase shifter.

14. The apparatus of claim 11, wherein two of the at least three of the p-n junctions are located on opposites sides of the lateral center of the silicon optical core in the segment thereof.

15. The apparatus of claim 11, wherein:
the optical phase shifter is formed on a substrate; and
the p-n junctions of the silicon optical core are oriented in a vertical direction transverse to the substrate.

16. The apparatus of claim 11, wherein:
the planar optical waveguide includes a lower optical cladding layer, the silicon optical core, and an upper optical cladding; and
the p-n junctions of the silicon optical core are oriented in a vertical direction between the lower optical cladding layer and the upper optical cladding.

17. An apparatus, comprising:
a traveling-wave Mach-Zehnder optical modulator having a parallel pair of optical waveguide arms;
wherein an optical phase shifter is along one of the optical waveguide arms, the optical phase shifter comprising:
an optical waveguide having a silicon optical core and a geometry of a rib waveguide, wherein dimensions of the silicon optical core as the rib waveguide include a rib width and a core thickness; and
a pair of biasing electrodes located along opposite sides of a segment of the silicon optical core;
wherein a transverse cross-section of the silicon optical core includes a plurality of p-n junctions in series extending in a direction transverse to an optical propagation direction of an optical signal and across the rib width of the silicon optical core in a segment of the optical waveguide including the segment of the silicon optical core;
wherein at least two of the p-n junctions are configured to be reverse biased by applying a voltage across the biasing electrodes;
wherein the optical phase shifter is configured to control a phase of the optical signal propagating through the optical waveguide by changing carrier densities at the at least two of the p-n junctions, due to varying the voltage, to alter a refractive index of the optical waveguide;
wherein the at least two of the p-n junctions comprise two reverse-biased p-n junctions offset from a lateral center of the silicon optical core in the segment thereof, and a single reverse-biased p-n junction aligned with the lateral center.

* * * * *